Figure 10:
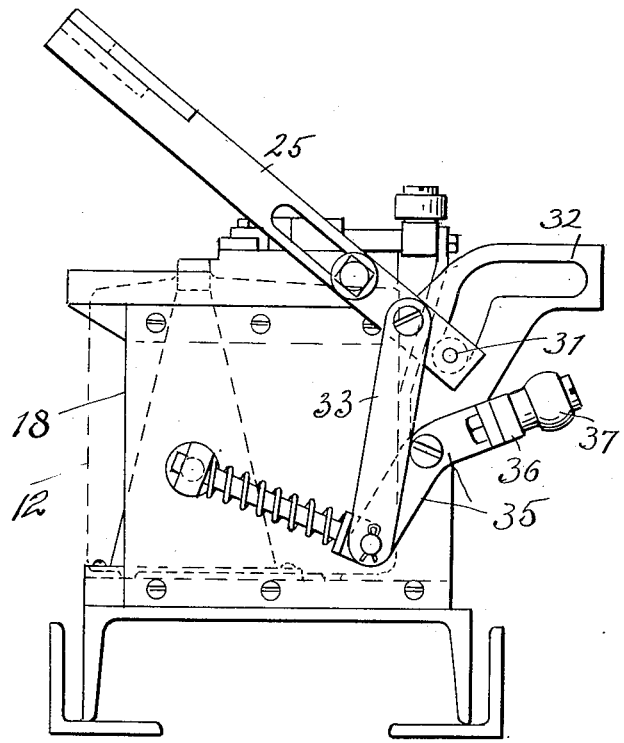

March 31, 1925.
P. E. NORRIS
1,531,753
APPARATUS FOR LEAD BURNING STRAPS TO STORAGE BATTERY PLATES
Filed Aug. 7, 1920  4 Sheets-Sheet 1
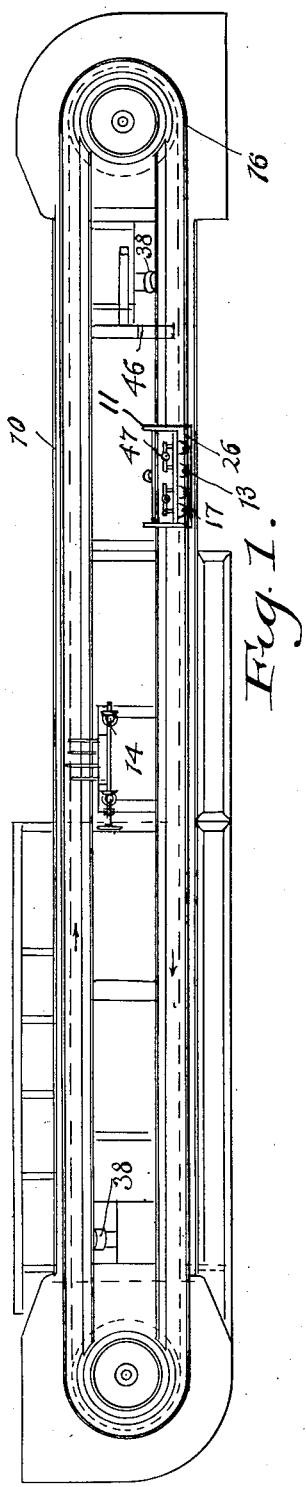
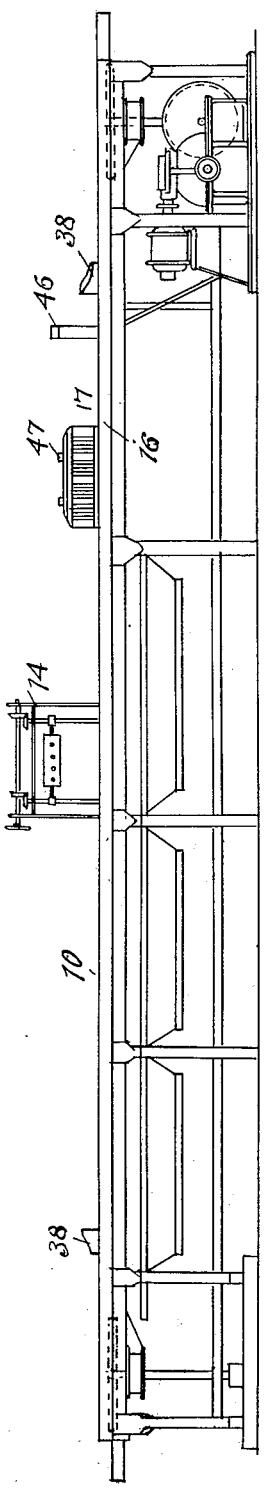

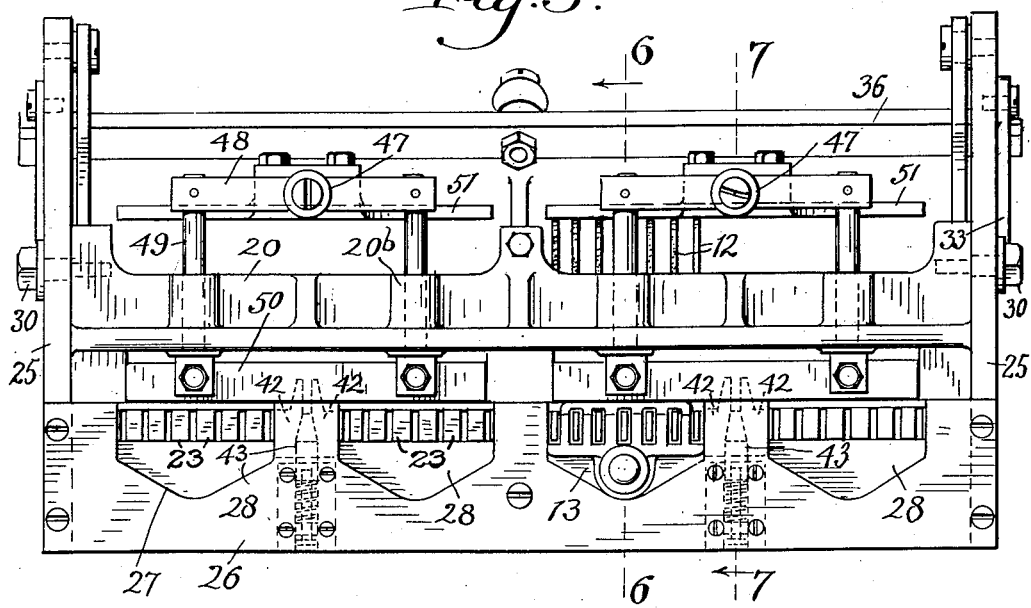
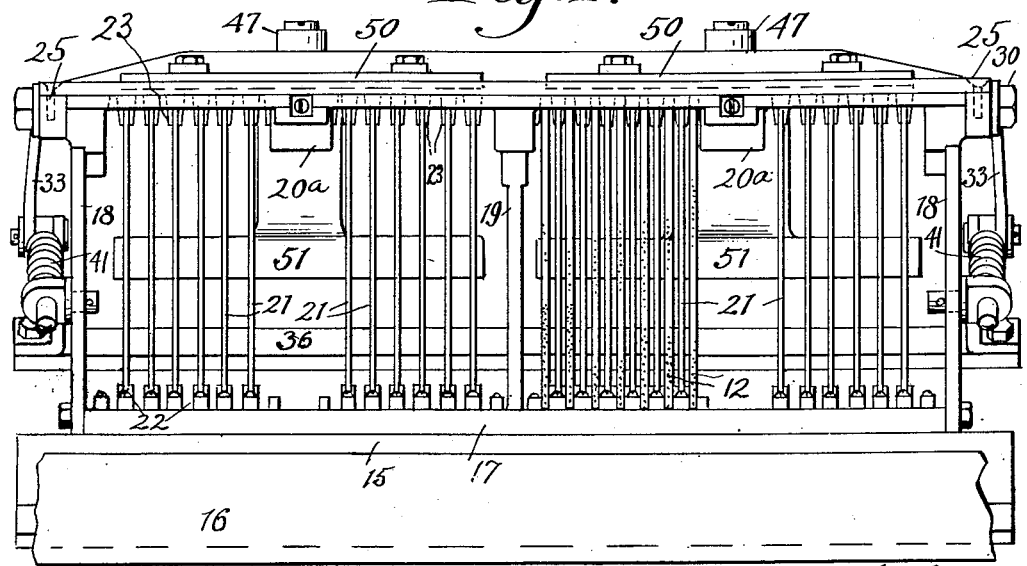

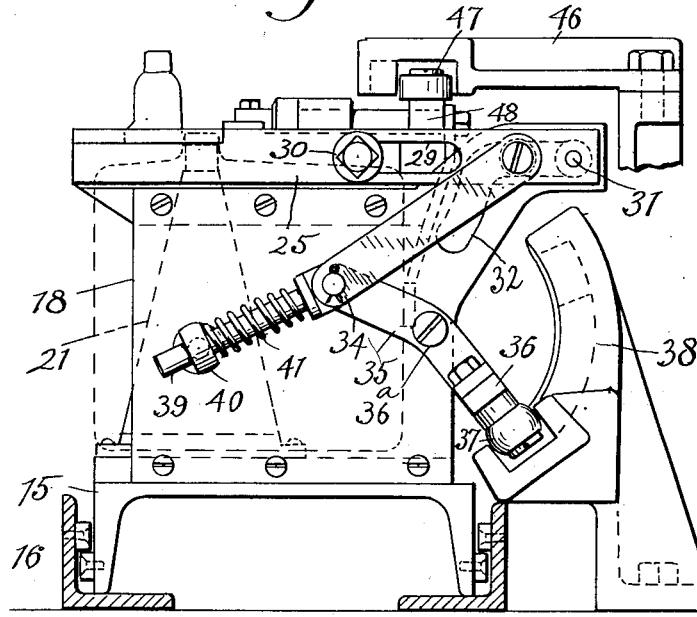
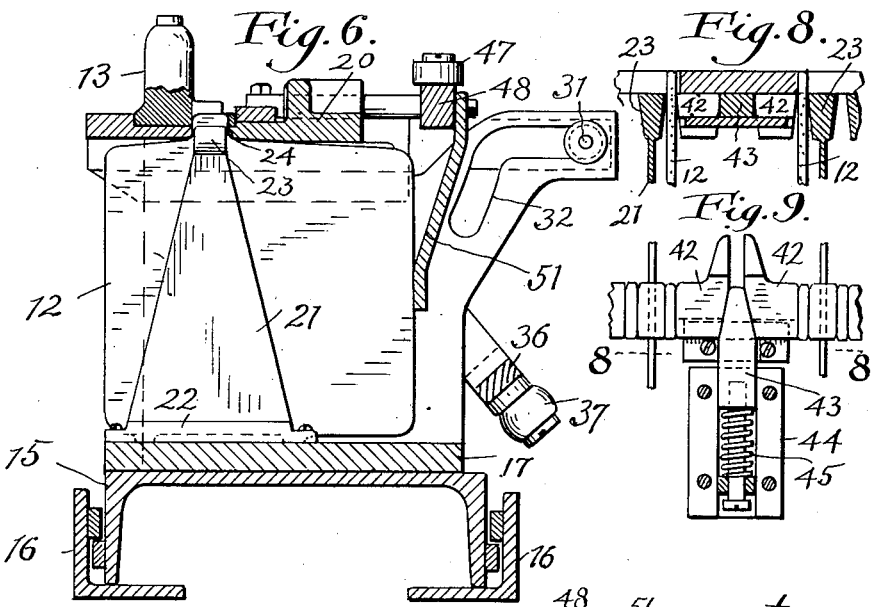
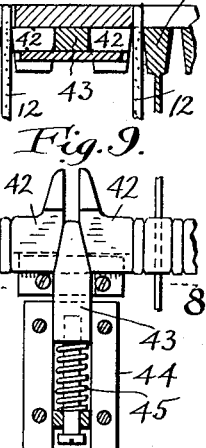
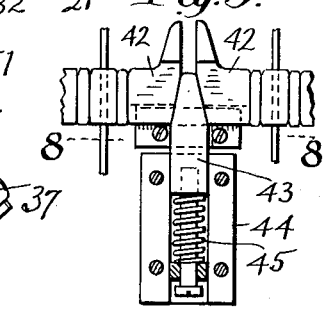
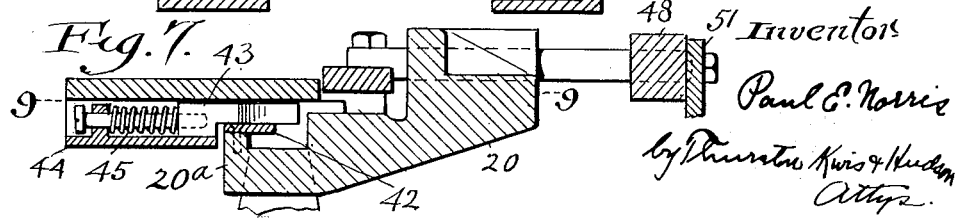

March 31, 1925. 1,531,753
P. E. NORRIS
APPARATUS FOR LEAD BURNING STRAPS TO STORAGE BATTERY PLATES
Filed Aug. 7, 1920 4 Sheets-Sheet 4

Patented Mar. 31, 1925.

1,531,753

UNITED STATES PATENT OFFICE.

PAUL E. NORRIS, OF SWISSVALE, PENNSYLVANIA, ASSIGNOR TO WILLARD STORAGE BATTERY COMPANY, OF CLEVELAND, OHIO, A CORPORATION OF WEST VIRGINIA.

APPARATUS FOR LEAD-BURNING STRAPS TO STORAGE-BATTERY PLATES.

Application filed August 7, 1920. Serial No. 401,866.

*To all whom it may concern:*

Be it known that I, PAUL E. NORRIS, a citizen of the United States, residing at Swissvale, in the county of Allegheny and State of Pennsylvania, have invented a certain new and useful Improvement in an Apparatus for Lead-Burning Straps to Storage-Battery Plates, of which the following is a full, clear, and exact description.

This invention relates to a lead-burning machine for storage battery plates, and is an improvement over the machine constituting the subject matter of my prior application, Serial No. 257676, filed October 10, 1918.

In said prior application I have disclosed a lead-burning machine having a horizontal endless conveyor for shifting a plurality of burning racks into each of which groups of storage battery plates are placed while the racks are traveling around the circuit. As the racks carrying these plates move around the machine, previously cast straps are placed over the lugs of each group of plates, then the straps and lugs are lead-burned together as they pass by the burning part of the machine, and finally as they pass a given point, an operator by shifting an ejector causes the groups of plates with the straps burned on to them to be ejected from the racks, after which the racks are cleaned and the operation is repeated.

The present invention relates particularly to certain improvements in the racks, the object being to provide a rack construction which will eliminate the so-called tears consisting of dripping portions of the lead which heretofore at times would run down the lugs beneath the straps.

In another aspect the invention resides in the provision of an automatic ejector composed of parts on the rack, and suitably formed and positioned cams carried by the frame of the machine and adapted to cause the plates with their straps to be ejected from the racks without any attention on the part of the operator.

The invention may be briefly summarized as consisting in certain novel details of construction, and combinations and arrangements of parts which will be described in the specification and set forth in the appended claims.

In the accompanying sheets of drawings, Fig. 1 is a top plan view of the machine showing particularly the guideway for the racks and conveyor, and the location of certain cams; Fig. 2 is a side view of the same; Fig. 3 is a top plan view of a portion of one of the racks; Fig. 4 is a face view of the same with one group of battery plates in position; Fig. 5 is an end view of the same; Fig. 6 is a sectional view substantially along the line 6—6 of Fig. 3; Fig. 7 is a slightly enlarged fragmentary sectional view substantially along the line 7—7 of Fig. 3; Fig. 8 is a detail sectional view substantially along the line 8—8 of Fig. 9; Fig. 9 is a sectional plan view substantially along the line 9—9 of Fig. 7, this view illustrating the action of the wedges; Fig. 10 is an end view similar to Fig. 5, but with the rack opened by the outward and upward movement of the strap supports and templet.

Referring now to the drawings, and first to Figs. 1 and 2, 10 represents a horizontal frame and guideway for an endless chain of racks 11, which are caused to travel continuously through the closed path so that while traveling around one side of the machine the racks may be filled with groups of storage battery plates such as shown at 12 in Fig. 6, certain operators filling the racks with the plates as the racks pass along. Other operators then place over the upwardly projecting lugs of the plates, connecting straps 13 which are provided with openings to receive the lugs on the plates, and then as the racks pass by the burning part 14 of the machine, the straps are burned to the ends of the lugs, after which the racks pass again to the front part of the machine and the groups of plates with the straps burned to them are ejected in a manner to be described.

Each rack is composed of an inverted channel base 15 which will be suitably connected to the endless chain as described in my prior application, the channel base 15 sliding along on the inturned flanges of angles 16 forming a trackway or guideway for the racks.

Additionally each rack is composed of a pair of horizontal bottom plates 17, only one of which is shown in the drawings since in the detail views of the rack approximately half the rack only is shown. The length of each half of the rack in this instance is such that it will accommodate four groups of plates, this being apparent from Figs. 3 and 4. At opposite ends of the bottom plate 17 are two upright end plates 18, and midway between the latter there is an intermediate upright plate 19. To the upper ends of the plates 18, 18 and 19 is secured a top member 20, preferably in the form of a casting. It will be understood that the bottom plate 17, the upright plates 18, 18 and 19, and the top casting 20 form a rectangular frame in which the groups of storage battery plates are adapted to be accommodated.

In accordance with the present invention, and particularly for the purpose of eliminating so-called "tearing", the bottom plate 17 is provided with groups of upstanding flexible plates between which the battery plates are adapted to be placed as they are inserted in the rack. These flexible plates 21 are secured at their lower ends in slots of guide strips 22 which are secured at their ends to the bottom plate 17, these guide strips 22 forming guides for the bottom portions of the battery plates 12 as they are slipped into the rack. The flexible plates 21 are substantially triangular in shape as shown in Fig. 6, the plates narrowing from the bottom to the top, and at the top being of the same width substantially as the lugs at the top of the battery plates. At the top of the flexible plates 21 are wedge shaped pieces 23, between which the lugs of the battery plates extend, and by which they are held after the plates are slipped into the rack, the top surfaces of these wedge-shaped pieces 23 being exactly flush, or in the same horizontal plane with a shoulder 24 at the front edge of the top casting 20 (see Fig. 6) and with the top surface of the movable strap supports next to be described. It might be mentioned at this point that when the battery plates are in position in the rack, the inner edges of the top lugs thereof bear against the front edge of this shoulder 24, while the upper portions of the lugs project slightly above the wedge-shaped pieces 23.

Each rack, or rather each half rack unit, such as illustrated in the drawings, is provided with a movable top frame including two arms 25 which are just outside of the end pieces 18 of the rack frame, and an upper front portion extending between the arms, which front portion comprises a plate called a templet 26, having openings 27 of a contour corresponding to the contour of the straps which are to be lead-burned to the lugs of the groups of plates, and further this front portion has strap supporting plates 28, which are secured to the under side of the templet, and which when the rack is closed with the movable top portion of the rack in normal position, engage the front edges of the lugs of the battery plates, and substantially engage the wedge-shaped pieces 23 at the top of the flexible plates 21. This is shown in Fig. 3.

As will subsequently appear, the templet openings with the strap supports 28, the shoulder 24 at the front edge of the top casting 20, and the upper surfaces of the wedge-shaped pieces 23 at the top of the flexible plates 21 form molds shaped in accordance with the shape of the straps so that the latter can be lead-burned to the lugs of the battery plates.

The end pieces 25 of the movable top portion of the rack have slots 29 which receive studs 30 which project laterally from the ends of the top casting 20, and at the rear of these slots the arms are provided with studs 31 which engage in substantially L-shaped slots 32 on the rear ends of the end plates 18, these slots having upper horizontal portions which dip downward at nearly right angles as shown in Figs. 5, 6 and 10.

To the rear portions of the arms 25 are pivoted links 33, which incline downwardly from the points of connection of the arms 25, and at their lower ends are connected by pins 34 to the ends of levers 35, pivotally supported at 36ª on the end plates 18. To the rear ends of these levers 35 is connected a cross-bar 36 carrying a roller 37 adapted to be engaged successively by two cams 38, one to close the rack or to move the parts to the position shown in Fig. 5, and the other to open the rack or to move the parts to the position shown in Fig. 10.

Pivoted to the pins 34 connecting the links 33 to the levers 35 are sliding bolts 39 which slidingly engage abutments 40 on the end plates 18, and which are surrounded by coil springs 41, the chief function of which is to press the strap supports 28 of the movable part of the rack tightly against the front edges of the lugs of the battery plates when the rack is closed, or when the parts are in the position shown in Figs. 5 and 6.

With this construction when the rack is opened by the opening cam 38, the movable top part of the rack is given first an outward movement as the studs 31 travel through the horizontal portions of the slots 32, and then is swung upward to the position shown in Fig. 10, and while the rack is being closed by the closing cam 38, the reverse movements take place, i. e. the movable top part of the rack is first swung downward and then is moved inward. This movement is necessary in order that while the rack is being opened the strap supports 28 will pass from beneath the straps which have been lead-burned to the plates before the pivoting or swinging movement which shifts the parts to the position shown in Fig. 10 takes place.

It was heretofore stated when the rack is closed the movable part of the rack together with the front shoulder of the top casting and the top surfaces of the wedge-shaped pieces at the upper ends of the flexible plates 21 form molds corresponding substantially to the contour of the straps, the lugs of the battery plates projecting up through the bottom of these molds between the wedge-shaped pieces 23 when the plates are in position. However, inasmuch as the lugs of the battery plates fit rather loosely between the pieces 23 at the upper ends of the flexible plates 21 when the plates are first inserted in the rack, melted lead could run down between the lugs and the pieces 23, as has occurred heretofore. To avoid this, provision is made for causing a tightening and clamping action between the lugs of the plates and the pieces 23 at the top of the flexible plates 21 on the closure of the rack. I therefore provide between the two sets of flexible plates 21 on each side of the intermediate plate 19 of the frame of the rack, a pair of laterally movable clamping abutments 42, which are slidingly supported in slots or guideways in lugs 20ª of the top casting 20, which lugs project forwardly between the two sets of plates 21 as shown in Fig. 4. These clamping abutments 42, which are shown by dotted lines in Fig. 3, and by full lines in Figs. 7, 8 and 9, are in line with the wedge-shaped pieces 23 at the top of the flexible plates 21. It will be observed that the inner adjacent faces of the clamping abutments 42 are tapered, leaving a wedge-shaped opening for a spreader. Additionally I provide on the movable top part of the rack, wedges 43 constituting such spreader, indicated by dotted lines in Fig. 3, and by full lines in Figs. 7, 8 and 9. These wedges are so positioned that as the movable top part of the rack slides horizontally inward in the final closing movement thereof, they (the wedges) enter between the pairs of clamping abutments 42 and move them laterally, thus causing the lugs of the battery plates to be clamped between the wedge-shaped pieces 23 at the top of the flexible plates 21, causing the bottom of each mold to be tightly closed at the points where the lugs of the battery plates project upwardly above the pieces 23. This will effectively prevent the formation of tears during the lead-burning operation.

The wedges 43 are supported for a slight endwise movement in wedge holders 44, secured to the under side of the movable top part of the rack, and coil springs 45 (see Fig. 9) press the wedges forwardly and yieldingly resist their rearward movement, but permit them to move slightly relative to the top part of the rack to avoid shock and jamming.

After the straps have been lead-burned to the lugs of the battery plates, and when the rack is being opened, the wedges slide out from between the clamping abutments 42, and after the groups of plates with their straps are ejected from the rack the flexible plates 21 and the pieces 23 at the top thereof again assume their normal positions.

The automatic ejection of the groups of battery plates with their straps lead-burned thereto, is accomplished by providing at a suitable point on the stationary part of the machine an ejector cam 46 (see Figs. 1, 2 and 5), which cam is adapted to be engaged by rollers 47, of ejectors carried by the top casting 20 of the rack. As is apparent from Fig. 3, separate ejectors are provided for different groups of battery plates, one ejector being provided for two sets of plates. Each ejector includes in addition to the roller 47, a horizontal rear cross-piece 48 connected to the rear ends of a pair of sliding bolts 49, movable in an endwise direction in a pair of bosses 20ᵇ of the top casting 20. At the forward end of these bolts 49 is an ejector bar 50 which is slidingly mounted in the front part of the top casting and positioned so that when moved forwardly it will engage the rear edges or shoulders of the straps lead-burned to the two groups of plates to be ejected by the ejector. Additionally the ejector includes a plate (see particularly Fig. 6) 51, which at its upper end is secured to the rear cross-bar 48, and at its lower end is adapted to engage the upright rear edges of the battery plates substantially at the middle points thereof. This is clearly shown in Fig. 6. In consequence, by reason of the fact that the ejector engages the straps and at the same time the battery plates as shown, the groups of plates are, on the forward movement of the ejector, ejected from the rack without causing any bending of the plates or straps. The ejector can be returned to normal position either by a cam or by the use of a return spring.

By reference to Figs. 1 and 2, it will be seen that the two closing and opening cams 38 which are shown only conventionally, are located near opposite ends of the machine and on opposite sides thereof, and that the ejector cam 46 is located close to one of the cams 38 at the right hand side of Figs. 1 and 2. While the racks are traveling along the near side of Fig. 1, in the direction indicated by the arrow, they are filled with plates, and as they pass the cam 38 at the left hand end of Figs. 1 and 2 and are now traveling in the opposite direction along the far side of Fig. 1, the racks are automatically closed. Then the straps are set into the templet openings of the top part of the rack onto the lugs at the tops of the battery plates. Then the straps are burned to the lugs and shortly after the racks reach the near side of Fig. 1 and are again traveling in the direction indicated by the lower arrow of this figure they are automatically opened by the cam 38 at the right hand side of Fig. 1, it being understood that the top part of the rack is given first a forward and then an upward swinging motion, the forward movement enabling the strap supports to pass from under the straps which are now lead-burned to the lugs of the battery plates, and enabling the wedges 43 to be withdrawn from the clamping abutments 42. Shortly thereafter the cam 46 acts on the several ejectors of each rack and causes the plates to be ejected. An operator then removes the groups of plates with the straps cast to them and after the racks have been cleaned in the manner illustrated in my prior application they are again filled with plates.

Having described my invention, I claim:

1. In an apparatus for lead-burning together straps and storage battery plates, a rack adapted to receive groups of storage battery plates, comprising a frame adapted to receive the plates and support them in spaced relation, and a movable part carried by the frame adapted to be moved to open and closed position and when in closed position with reference to the frame co-operating with said frame to form molds into which lugs of the battery plates project.

2. In an apparatus for lead-burning together straps and storage battery plates, a rack for the plates including a frame into which the plates are adapted to be slipped, and having yieldable members which are between the plates when the latter are in position for the lead-burning operation, a strap receiving part, and means for causing said yieldable members to be wedged laterally to form a closed space for molten lead.

3. In an apparatus for lead-burning together straps and storage battery plates, a rack having upstanding flexible members between which the plates are adapted to be placed, said flexible members having at the top portions adapted to be clamped against the lugs of the plates and to bridge the space between the same, means for receiving and supporting the strap to be lead-burned to the lugs, and means for causing said portions at the top of the flexible plates to be spread laterally prior to the lead-burning operation.

4. In an apparatus for lead-burning together straps and storage battery plates, a rack having flexible members between which storage battery plates are adapted to be placed, a movable top part carried by the rack adapted to receive and support straps to be lead-burned to the plates, and means for moving said flexible members laterally so as to clamp the lugs of the battery plates when said movable part of the rack is moved to closed position.

5. In an apparatus for lead-burning together straps and storage battery plates, a rack having means between which storage battery plates are adapted to be placed and said rack having a movable top portion adapted to receive straps to be burned to lugs of the plates, and means for giving said movable top portion a rectilinear and then a swinging motion.

6. In an apparatus for lead-burning together straps and storage battery plates, a rack adapted to receive groups of storage battery plates and provided with spacing means between which the plates are adapted to be placed and said rack having a movable top portion adapted to receive straps to be burned to lugs of the plates and to form substantially closed molds with said spacing means, and means for giving said movable top part first a horizontal motion and then a swinging motion while said movable portion is moved to open position.

7. In an apparatus for lead-burning together straps and storage battery plates, a rack adapted to receive groups of storage battery plates and provided with spacing means between which the plates are adapted to be placed and said rack having a movable top portion adapted to receive straps to be burned to lugs on the plates and to form substantially closed molds with said spacing means, and means for giving said movable top portion first a horizontal motion and then a swinging motion while said movable portion is moved to open position and the reverse motions when it is moved to closed position, and means for wedging said spacing means against the lugs of said battery plates when said movable top portion is shifted to closed position.

8. In an apparatus for lead-burning together straps and storage battery plates, a frame forming a guideway, a plurality of racks adapted to be moved through said guideway in a closed path and adapted to receive groups of storage battery plates and straps which are to be lead-burned thereto, means by which the straps and plates are lead-burned together as they pass a given part of the guideway, ejectors carried by the racks, and means located at a given point of the guideway for causing said ejectors to automatically eject the groups of plates with the straps lead-burned thereto.

9. In an apparatus for lead-burning together straps and groups of storage battery plates, an endless guideway, a plurality of racks movable in an endless path around the guideway, each rack adapted to receive plates and straps and having a movable top adapted to be shifted to open and close the rack, ejecting means carried by the rack, and devices positioned about the guideway for automatically closing and subsequently opening the rack and for operating the ejector.

In testimony whereof, I hereunto affix my signature.

PAUL E. NORRIS.